United States Patent
Felix et al.

(10) Patent No.: US 11,900,109 B2
(45) Date of Patent: Feb. 13, 2024

(54) INSTRUCTION FOR MASKING RANDOMLY SELECTED VALUES IN A SOURCE VECTOR FOR NEURAL NETWORK PROCESSING

(71) Applicant: Graphcore Limited, Bristol (GB)

(72) Inventors: Stephen Felix, Bristol (GB); Simon Christian Knowles, Corston (GB); Godfrey Da Costa, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 219 days.

(21) Appl. No.: 15/886,331

(22) Filed: Feb. 1, 2018

(65) Prior Publication Data

US 2019/0121639 A1    Apr. 25, 2019

(30) Foreign Application Priority Data

Oct. 20, 2017 (GB) ..................... 1717306

(51) Int. Cl.
*G06F 9/30* (2018.01)
*G06N 3/08* (2023.01)

(52) U.S. Cl.
CPC ...... *G06F 9/30036* (2013.01); *G06F 9/30018* (2013.01)

(58) Field of Classification Search
CPC ... G06F 9/30018; G06F 9/30036; G06N 3/02; G06N 3/08
See application file for complete search history.

(56) References Cited

U.S. PATENT DOCUMENTS

| | | | | |
|---|---|---|---|---|
| 5,600,843 | A * | 2/1997 | Kato | G06F 15/17337 712/19 |
| 5,675,526 | A * | 10/1997 | Peleg | G06F 7/53 708/518 |
| 2008/0165955 | A1* | 7/2008 | Ibrahim | H04L 9/3066 380/30 |
| 2016/0307098 | A1 | 10/2016 | Goel et al. | |
| 2016/0342889 | A1* | 11/2016 | Thorson | G06N 3/063 |
| 2018/0046900 | A1* | 2/2018 | Dally | G06N 3/0427 |

(Continued)

FOREIGN PATENT DOCUMENTS

| | | |
|---|---|---|
| JP | 2016541038 | 12/2016 |
| KR | 20160113704 | 9/2016 |
| TW | 200402799 | 2/2004 |

OTHER PUBLICATIONS

Molchanov et al., "Variational Dropout Sparsifies Deep Neural Networks", Jun. 13, 2017, 10 pages.*

(Continued)

*Primary Examiner* — David J. Huisman
(74) *Attorney, Agent, or Firm* — HAYNES AND BOONE, LLP

(57) ABSTRACT

The present invention relates to an execution unit for executing a computer program comprising a sequence of instructions, which include a masking instruction. The execution unit is configured to execute the masking instruction which, when executed by the execution unit, masks randomly selected values from a source operand of n values and retains other original values from the source operand to generate a result which includes original values from the source operand and symbols in place of the selected values.

19 Claims, 4 Drawing Sheets

(56) References Cited

U.S. PATENT DOCUMENTS

| | | | | |
|---|---|---|---|---|
| 2018/0101768 A1* | 4/2018 | Laine | ...................... | G06N 3/08 |
| 2018/0157465 A1* | 6/2018 | Bittner | .................... | G06F 7/483 |
| 2018/0300629 A1* | 10/2018 | Kharaghani | ........... | G06N 3/082 |
| 2018/0314941 A1* | 11/2018 | Lie | ......................... | G06N 3/063 |

OTHER PUBLICATIONS

Yu et al., "Scalpel: Customizing DNN Pruning to the Underlying Hardware Parallelism" Jun. 2017, pp. 548-560.*

Penkovsky, "Theory and Modeling of Complex Nonlinear Delay Dynamics Applied to Neuromorphic Computing", Université Bourgogne Franche-Comté, Sep. 21, 2017, 147 pages.*

"RISC vs. CISC", Stanford University, Mar. 6, 2014, 3 pages, [retrieved on Jul. 30, 2021]. Retrieved from the Internet <URL: https://web.archive.org/web/20140306061645/https://cs.stanford.edu/people/eroberts/courses/soco/projects/risc/risccisc/>.*

Srivastava et al., "Dropout: A Simple Way to Prevent Neural Networks from Overfitting", Jun. 2014, pp. 1929-1958.*

Cha et al., H-BSP: A Hierarchical BSP Computation Model. The Journal of Supercomputing, Feb. 2001;18(2):179-200.

Kapre et al., An NoC Traffic Compiler for Efficient FPGA Implementation of Sparse Graph-Oriented Workloads. International Journal of Reconfigurable Computing. vol. 2011 (2011), Article ID 745147. 15 pages.

Valiant, A bridging model for parallel computation. Communications of the ACM, Aug. 1990;33(8):103-11.

Liu et al., Cambricon: An Instruction Set Architecture for Neural Networks. Proceedings of the $43^{rd}$ International Symposium on Computer Architecture. 2016:393-405.

Wan et al., Regularization of Neural Networks using DropConnect. ICML 2013. 12 pages.

Hinton, G.E., "Improving neural networks by preventing co-adaptation of feature detectors", Jul. 3, 2012, 18 pages, arXiv:1207.0580v1 [cs.NE] Department of Computer Science.

Extended Search Report for European Application No. 18200108-1 dated Mar. 21, 2019. Relevant pp. 2-4.

Combined Search and Examination Report for United Kingdom Patent Application No. GB1717306.3, dated Mar. 8, 2019. Relevant pp. 4-7.

Office Action dated Jan. 8, 2020 for Korean Application No. 10-2018-0125335.

Office Action dated Mar. 30, 2020 for Taiwan Patent Application No. 107136964.

Office Action dated Jan. 8, 2020 for Korean Patent Application No. 10-2018-0125335.

Examination Report dated Sep. 6, 2021 for EP Application No. 18200108.1. 10 pages.

* cited by examiner

INSTRUCTION FOR MASKING RANDOMLY SELECTED VALUES IN A SOURCE VECTOR FOR NEURAL NETWORK PROCESSING

CROSS-REFERENCE TO RELATED APPLICATIONS

This application claims the priority benefit under 35 U.S.C. § 119 of United Kingdom Patent Application No. 1717306.3, filed Oct. 20, 2017, the entire contents of which are incorporated herein by reference.

TECHNICAL FIELD

The present disclosure relates to processing data in neural networks.

BACKGROUND

Neural networks are used in the field of machine learning and artificial intelligence. Neural networks comprise arrangements of sets of nodes which are interconnected by links and which interact with each other. The principles of neural networks in computing are based on information about how electrical stimuli convey information in the human brain. For this reason the nodes are often referred to as neurons. They may also be referred to as vertices. The links are sometimes referred to as edges. The network can take input data and certain nodes perform operations on the data. The result of these operations is passed to other nodes. The output of each node is referred to as its activation or node value. Each link is associated with a weight. A weight defines the connectivity between nodes of the neural network. Many different techniques are known by which neural networks are capable of learning, which takes place by altering values of the weights.

FIG. 1 shows an extremely simplified version of one arrangement of nodes in a neural network. This type of arrangement is often used in learning or training and comprises an input layer of nodes, a hidden layer of nodes and an output layer of nodes. In reality, there will be many nodes in each layer, and nowadays there may be more than one layer per section. Each node $N_i$ of the input layer is capable of producing at its output an activation or node value which is generated by carrying out a function on data provided to that node. A vector of node values from the input layer is scaled by a vector of respective weights at the input of each node in the hidden layer, each weight defining the connectivity of that particular node with its connected node in the hidden layer. In practice, networks may have millions of nodes and be connected multi-dimensionally, so the vector is more often a tensor. The weights applied at the inputs of the node $N_h$ are labelled w0 . . . w2. Each node in the input layer is connected at least initially to each node in the hidden layer. Each node in the hidden layer can perform an activation function on the data which is provided to it and can generate similarly an output vector which is supplied to each of the nodes No in the output layer. Each node weights its incoming data, for example by carrying out the dot product of the input activations of the node and its unique weights for the respective incoming links. It then performs an activation function on the weighted data. The activation function can be for example a sigmoid. See FIG. 2. The network learns by operating on data input at the input layer, assigning weights to the activations from each node and acting on the data input to each node in the hidden layer (by weighting it and performing the activation function). Thus, the nodes in the hidden layer operate on the data and supply outputs to the nodes in the output layer. Nodes of the output layer may also assign weights to their incoming data. Each weight is characterised by a respective error value. Moreover, each node may be associated with an error condition. The error condition at each node gives a measure of whether the error in the weight of the node falls below a certain level or degree of acceptability. There are different learning approaches, but in each case there is a forward propagation through the network from left to right in FIG. 1, a calculation of overall error, and a backward propagation from right to left in FIG. 1 through the network of the error. In the next cycle, each node takes into account the back propagated error and produces a revised set of weights. In this way, the network can be trained to perform its desired operation.

One problem which can arise with a neural network is "overfitting". Large networks with millions or billions of parameters (weights) can easily overfit. Overfitting causes a network to remember each training sample that has been provided to it (a training sample providing data to the input nodes), rather than be trained to extract relevant features so that the neural net is appropriate, after it has been trained, for application to more generally extract features from samples. A wide range of techniques has been developed to solve this problem by regularising neural networks to avoid overfitting/memorising.

A technique called "Drop out" is discussed in a paper by JE Hinton et al entitled "Improving Neural Networks by Preventing Co-Adaption of Feature Detectors" CoRR abs/1207.0580 (2012). According to this technique, for each training example, forward propagation involves randomly deleting half the activations in each layer. The error is then back propagated only through the remaining activations. It has been shown that this significantly reduces overfitting and improves net performance.

Another technique known as "Drop connect" is discussed in the paper entitled "Regularisation of Neural Network using Drop connect" authored by Li Wan et al published by the Department of Computer Science NYU. According to this technique, a subset of weights are randomly zeroed for each training example, during forward propagation. This technique has similarly been shown to improve the performance of neural networks.

Implementing neural networks using known computer technology has various challenges. Implementing specific techniques like Drop out and Drop connect, for example using a CPU or GPU is non-trivial and may impact the full benefits that could be achieved with efficient implementation.

SUMMARY

The present inventors have developed an execution unit for a processor which can efficiently implement Drop out or Drop connect based on a single instruction in an instruction sequence of the processing unit.

According to an aspect of the invention there is provided an execution unit for executing a computer program comprising a sequence of instructions, the sequence including a masking instruction, wherein the executed unit is configured to execute the masking instruction which, when executed by the execution unit, masks randomly selected values from a source operand having n values and retains other original values from the source operand to generate a result which includes original values from the operand and symbols in the respective original locations of the selected values.

The execution unit may comprise a hardware pseudo random number generator (HPRNG) configured to generate a randomised bit string from which random bit sequences are derived for randomly selecting the values to be masked.

In one embodiment each randomised bit string output from the HPRNG comprises m bits and the execution unit is configured to divide the m bits into p sequences and to compare each of the p sequences with a probability value to generate a weighted probability indicator for selectively masking the values.

The masking instruction may comprise a source field identifying the source operand, an indication of a destination register for holding the result and a probability field defining the probability value.

The execution unit may comprise an input buffer for holding the source operand and an output buffer for holding the result.

The values of the source operand may represent weights of links in a neural network (e.g. to implement Drop connect).

The values in the source operand may represent activations defining output values of nodes in a neural network (e.g. to implement Dropout).

The sequence of instructions can comprise instructions for implementing a dot product of the result with a further set of values, and/or an instruction for writing the result to a memory location after the masking instruction has been executed.

The source operand may comprise any convenient number of values of any appropriate length e.g. four 16-bit values, two 32-bit values, or eight 8-bit values (by way of non-limiting example). In general, n values could be one or more values.

A corresponding method and computer program are provided.

One aspect provides a method of executing a computer program comprising a sequence of instructions, the sequence including a masking instruction, the method comprising, responsive to execution of the masking instruction, randomly selecting values from a source operand of n values and retaining other original values from the source operand to generate a result which includes original values from the source operand and symbols in the respective original locations of the selected values.

A randomised bit string output comprising m bits may be provided, and the method may comprise dividing the m bits into p sequences and comparing each sequence with a probability value to generate a weighted probability indicator for selectively masking the values.

The masking instruction may comprise a source field identifying the source vector, an indication of a destination register for holding the result and a probability field defining the probability value.

The sequence of instructions may comprise instructions for implementing a dot product of the result with a further set of values.

The sequence of instructions may comprise an instruction for writing the result to a memory location after the masking instruction has been executed.

Another aspect provides a computer program comprising a sequence of computer readable instructions stored on non transmissible media the sequence including a masking instruction which, when executed, randomly selects values to mask from a source operand of n values and retains other original values from the source operand to generate a result which includes original values from the source operand and symbols in the respective original locations of the selected values.

When used herein, the terms 'random' and 'randomly' are taken to mean random or pseudorandom.

DETAILED DESCRIPTION

Figure 3:
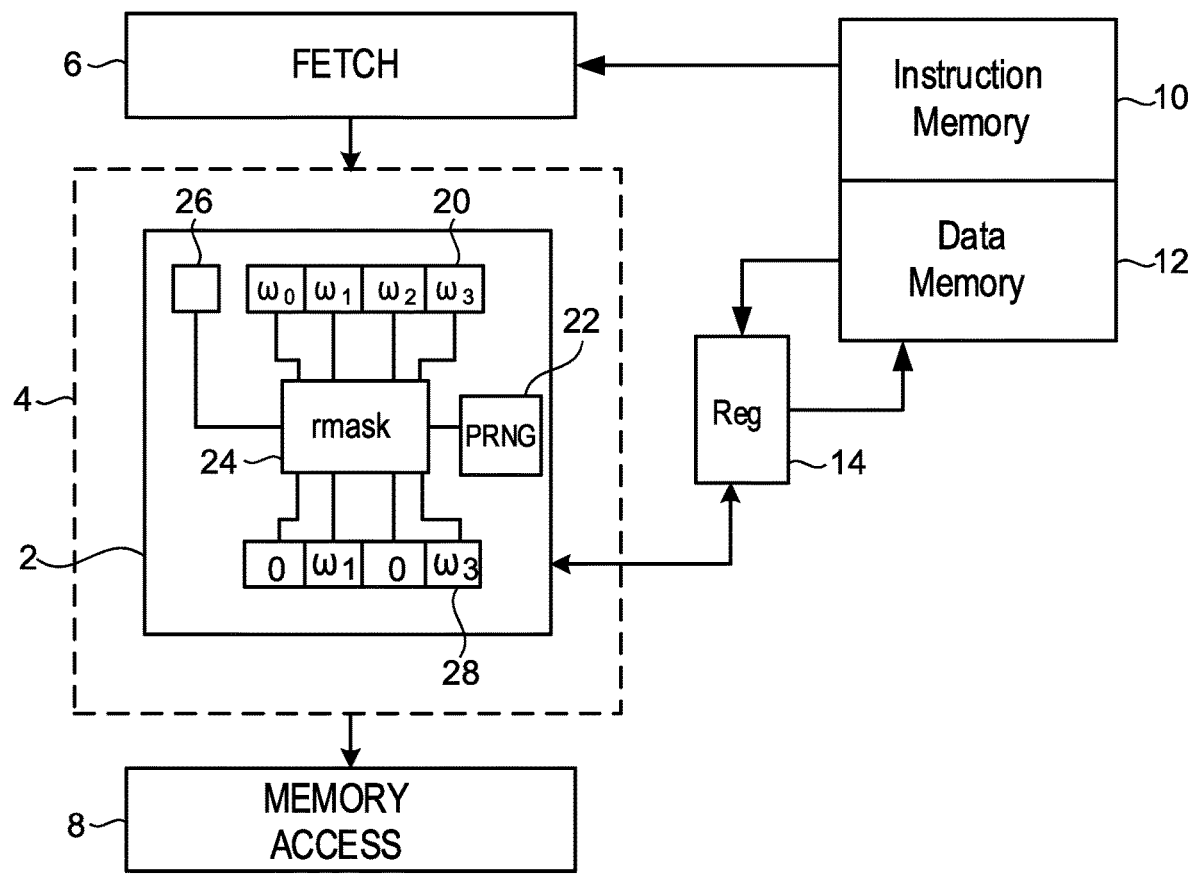
FIG. 3 is a schematic diagram of a processing unit in accordance with an embodiment of the invention.
Figure 4:
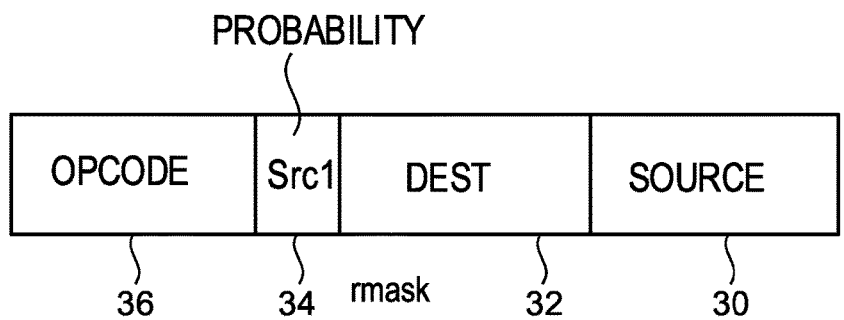
FIG. 4 shows the format of a masking instruction.

FIG. 3 shows a schematic block diagram of an execution unit arranged to execute a single instruction for masking randomly selected values in a vector. The instruction is referred to herein as the rmask instruction. The execution unit 2 forms part of a pipeline 4 in a processing unit. The processing unit comprises an instruction fetch unit 6 which fetches instructions from an instruction memory 10. The processing unit also comprises a memory access stage 8 which is responsible for accessing a data memory 12 for loading data from the memory or storing data into the memory. A set of registers 14 is provided for holding source and destination operands for the instructions being executed at any instance by the pipeline 4. It will readily be understood that the pipeline 4 may contain many different types of execution unit for executing a variety of different instructions, for example for performing mathematical operations. One type of processing unit which may be useful with the present invention is a processing unit using barrel-threaded time slots, in which a supervisor thread may allocate different worker threads to different time slots for their execution. The rmask instruction described herein may be used with any suitable processing unit architecture. FIG. 4 shows the rmask instruction format. The instruction has a field 30 which defines a source memory location from which a source operand is to be retrieved, and a field 32 for a destination memory location into which the output vector is to be placed.

The memory location could be an implicitly or explicitly defined register in the registers 14, or an address in the data memory. The rmask instruction further defines a probability value Src1 34 with which each individual value within the source operand will be kept, as described in more detail later. The instruction has opcode 36 which identifies it as the rmask instruction. The rmask instruction comes in two different formats. In one format of the instruction, the source operand may represent a vector comprising four 16-bit values (a half precision vector), and in another format the source operand might define a vector comprising two 32-bit values (a single precision vector).

In each case, the rmask instruction has the effect of masking (putting to 0) randomly selected values in the source vector. Such a function has a number of different applications, including in particular functions, which have been described above, known in the art of neural nets as 'Drop connect' and 'Drop out'. As already explained, in a neural net a vector representing weights may be provided, these weights representing links between neurons in the net.

Another vector may represent activations, these activations being values output to the individual neurons which are connected by the links.

A very common function in neural nets is to carry out a dot product between these two vectors. For example, the dot product could be the pre-activation value, which is the value from which a neuron output is calculated using an activation function. Applying the rmask instruction to the vector of weights prior to calculating this dot product can be used to implement the Drop-connect function. Application of the rmask instruction to the vector of weights randomly zeroes individual weights within the vector.

Applying the rmask instruction to the vector of activations prior to calculating the dot product can be used to implement the Dropout function. Applying the rmask instruction to the vector of activations randomly zeroes individual activation values within the vector.

Figure 1:
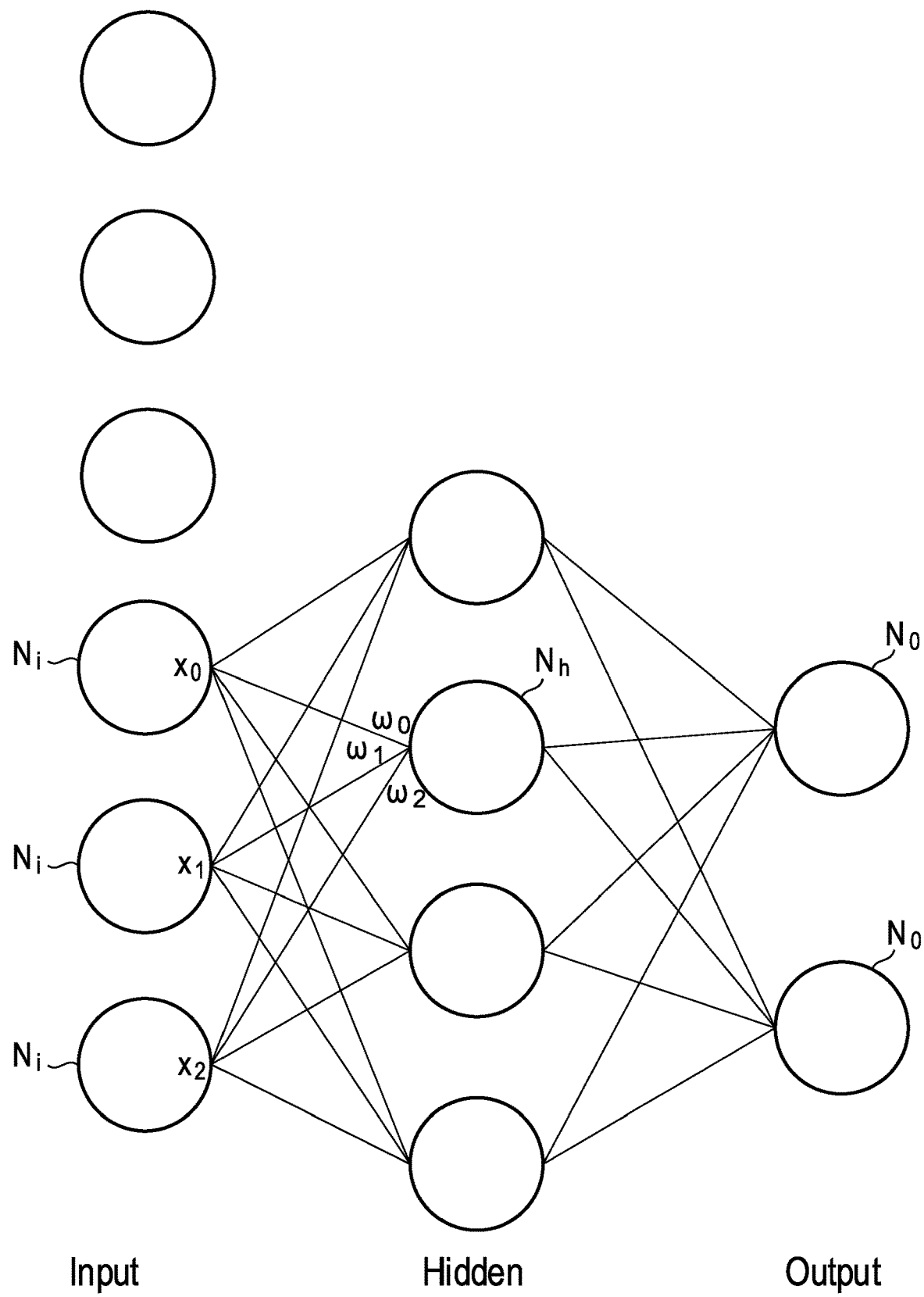
FIG. 1 is a highly simplified schematic view of a neural net.
Figure 2:
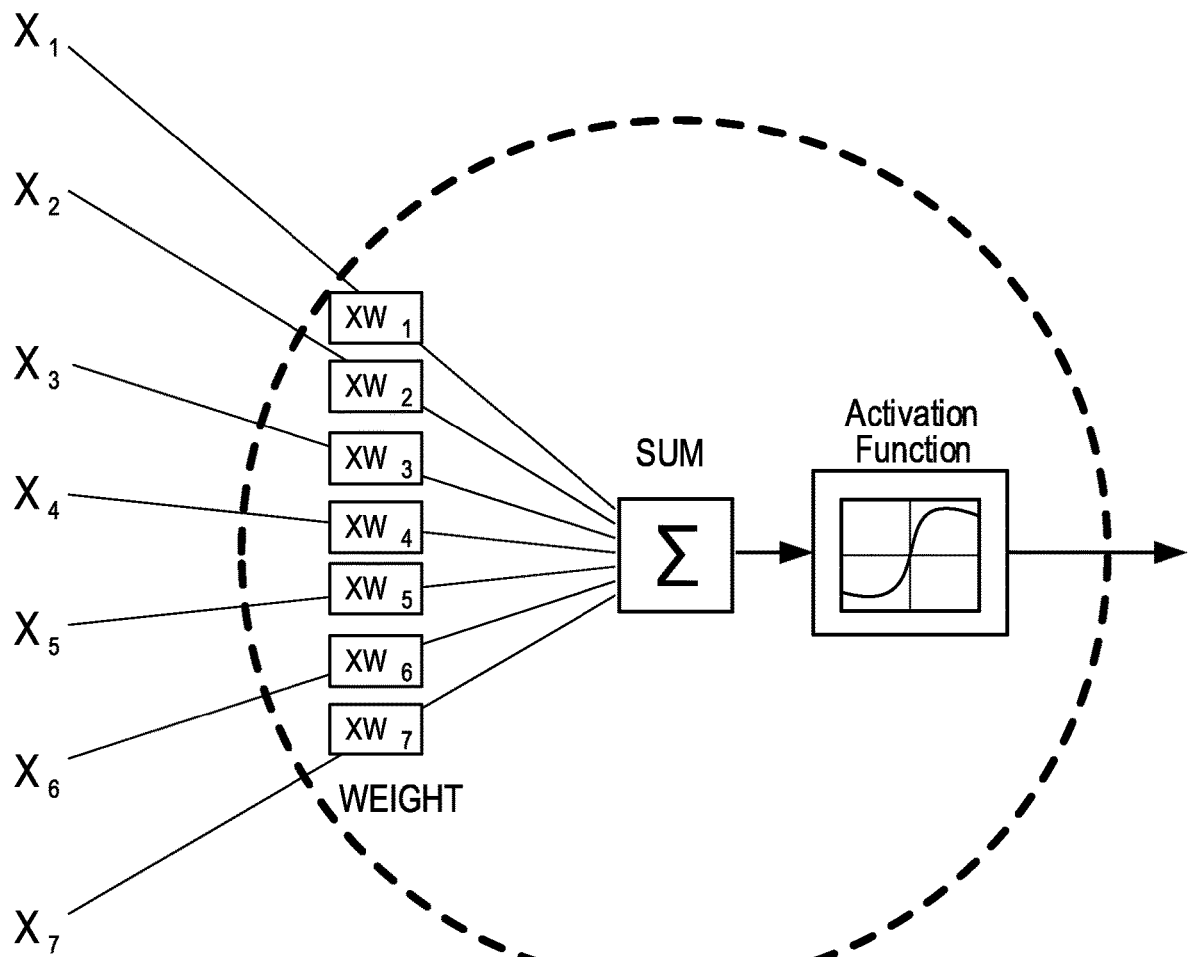
FIG. 2 is a highly simplified schematic view of a neuron.

The vectors may represent floating point numbers in both single or half precision. One type of vector may comprise four 16-bit values (a half precision vector), and another type of vector may comprise two 32 bit values (a single precision vector). In FIG. 2, an execution unit is shown which operates on four 16-bit values or two 32-bit values. The execution unit 2 in FIG. 3 has an input buffer 20 which can hold four 16-bit values or two 32-bit values. It is shown holding four 16-bit values, each representing a weight $w_0 \ldots w3$ The unit has a pseudo random number generator 22 implemented in hardware for providing random numbers to an rmask module 24. An input buffer location 26 is provided to hold a probability with which each individual value within the vector will be kept. This probability value may be provided in the instruction (as shown in FIG. 4), or could be set by an earlier instruction and accessed from a register or memory address with an rmask instruction. It could be a 17-bit immediate value in the instruction for example. The rmask module uses the random number generated by the PRNG 22 and the probability value 26 to randomly mask (put to 0) values of the input vector. The output vector is placed into an output buffer 28. In FIG. 3, the first and third values are shown as having been masked to 0. Note that the probability is the probability with which each individual value will be kept (i.e. not masked). For example, if the probability is set to 0.5, then each individual value has a probability of 0.5 that it will be masked. The probability of all four values being masked to 0 is therefore $(0.5)^4$, i.e. 1/16. The random number generator introduces the required randomness into the masking by providing an indication of which of the values should be masked, based on the probability.

Figure 5:
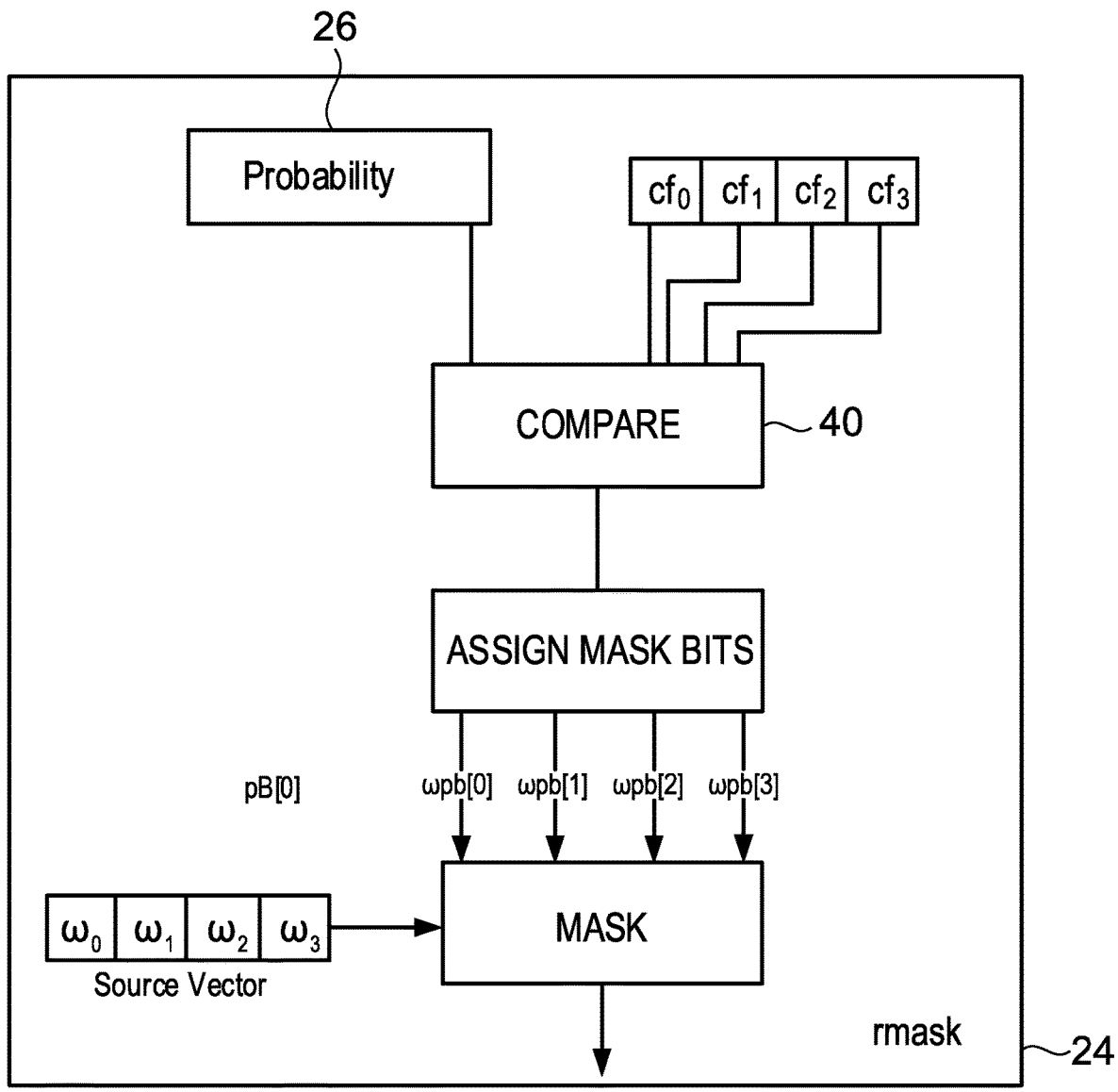
FIG. 5 is a block diagram of an execution unit for implementing the masking instruction.

The rmask module operates as follows, with reference to FIG. 5. The pseudo random number generator 22 produces a 64-bit output. For each output, four 16-bit fields $cf_0 \ldots cf_3$ are produced and tested against the probability value in the source operand. Note that for the single precision mode, two 32-bit fields are produced and similarly tested against the probability value in the source operand.

When the mask instruction is instigated, a 64-bit output of the PRNG is provided. For each output, four 16-bit fields are formed. Res0[15:0] refers to the least significant 16 bits of the PRNG output, and this syntax applies to the other three fields. Each of these fields is assigned to a cf field (cf standing for comparison field) and each of the comparison fields cf0 . . . cf3 is 16 bits long.

assign cf0[15:0]=res0[15:0];
assign cf1 [15:0]=res0[31:16];
assign cf2[15:0]=res0[47:32];
assign cf3 [15:0]=res0[63:48];

Then, four weighted random bits wpb[0] . . . wpb[3] are derived by comparing each comparison field cf0 . . . 3 with the probability value from the source operand src1 [15:0], using compare logic 40.

assign wpb[0]=(src1 [16]==1 cf0<src1 [15:0])? 1'b1: b0;
assign wpb[1]=(src1 [16]==1 cf1<src1 [15:0])? 1'b1: 1'b0;
assign wpb[2]=(src1 [16]==1 cf2<src1 [15:0])? 1'b1: 1'b0;
assign wpb[3]=(src1 [16]==1 cf3<src1 [15:0])? 1'b1: 1'b0;

The above syntax means that bit wpb[0] is assigned the value '1' if src1 [16]=1, or cf0<src1 [15:0]. Here, cf0 is a 16-bit unsigned random value, which can have values in the range {0 . . . 65535}; src1 is a 32-bit wide operand but only the least significant 17-bits are used for rmask; src1 is allowed values in the range {0 to 65536}, such that the probability of being 'unmasked' is src1/65536.

Note that for the allowed src1 range of {0 . . . 65536}, the $17^{th}$ bit of src1 (src1 [16]) is set only for the value 65536. Since the maximum value of cf0 is 65535 and 65535<65536, wpb[0] is automatically '1' when src1 [16]=1.

Subsequently the four bits wpb[0 . . . 3] are used respectively to unmask the 4, 16-bit values in src0[63:0] respectively as shown in the following example where aDst is a destination operand and aSrc0 is a source operand, referred to generically as src in the previous text, thus:

assign aDst[15:0]=(wpb[0], 1)? aSrc0[15:0]: 16'b0;
assign aDst[31:16]=(wpb[1], 1)? aSrc0[31:16]: 16'b0;
assign aDst[47:32]=(wpb[2], 1)? aSrc0[47:32]: 16'b0;
assign aDst[63:48]=(wpb[3]==1)? aSrc0[63:48]: 16'b0;

Where 16'b0 denotes a 16-bit wide sequence with value "0", 1'b0 means a bit of value "0" and 1'b1 means a bit of value "1".

For example, aDst[31:16]=aSrc0[31:16] if wpb[1]==1; otherwise aDst[31:16]=0.

In one embodiment the probability value aSrc1 is used to select the probability with which values are randomly 'unmasked' (ie: not masked). This is defined as an unmasking probability.

If operand aSrc1=65536 then all values are always unmasked.

If operand aSrc1=49152 then each value is masked independently with a probability of 0.25 and unmasked with a probability of 0.75.

If operand aSrc1=32768 then each value is masked independently with a probability of 0.50 and unmasked with a probability of 0.50.

If operand aSrc1=16384 then each value is masked independently with a probability of 0.75 and unmasked with a probability of 0.25.

If operand aSrc1=0, then all values are always masked.

'unmasking' an input means reproducing that value represented by the input at the output. The output format and precision is not necessarily the same as the input format.

'masking' an input means producing at the output a symbol representing the value of zero instead of the value represented at by input.

Note that an unmasking probability=1−masking probability.

In the implementation of rmask described herein the unmasking probability value aSrc1=65536* unmasking probability. The corresponding masking probability value can be derived from the masking probability: 65536*(1−masking probability).

Thus it will be appreciated that either a masking probability or an unmasking probability be defined (the two sum to '1').

The rmask instruction has a number of different applications. For example, when implementing Drop out it could be used just prior to writing neural outputs to memory. All neurons in the next stage of the neural net would then pick up the masked activations from the previous layer.

When implementing Drop connect, the rmask instruction could be used just after reading activations from memory, just prior to calculating the dot product. The instruction is agnostic as to what the source vector represents and therefore there are other applications beyond Drop out and Drop connect. The instruction is also agnostic to the format of the 16- or 32-bit scalar values within the source vector. In the output, each scalar value is either left unaltered or all bits are masked to zeroes. Thus, the mask instruction could be used to mask a vector of four 16-bit signed or unsigned integers or a variety of 16-bit floating point number formats. The only requirement of the scalar value format is that the value of the number represented by all bits to zero is "0".

In some number formats, there may be more than one possible symbol representing the value of zero.

For example, in the IEEE half precision floating point number format, both of the following symbols can be used to represent zero:
16b0000000000000000 (positive zero)
16b1000000000000000 (negative zero)

The term 'random' used herein can mean 'truly random' or 'pseudorandom'. The rmask instruction could use either a pseudorandom or a true random bit sequence generator.

Pseudorandom numbers are generated by a 'pseudorandom number generator' or 'PRNG'. PRNGs can be implemented in software or hardware. True random numbers are generated by a 'true random number generator' or 'TRNG'. An example of a TRNG is a "Transition Effect Ring Oscillator". An advantage of PRNGs over TRNGs is determinism (running the same program twice with the same starting conditions always has the same result).

An advantage of TRNGs over PRNGs is that the output is truly random (while the output of a PRNG satisfies a finite set of arbitrarily chosen mathematical properties; the state and output of a PRNG is always predictable from the current state and therefore not truly random).

While particular embodiments have been described, other applications and variance of the disclosed techniques may become apparent to a person skilled in the art once given the disclosure hearing. The scope of the present disclosure is not limited by the described embodiments but only by the accompanying claims.

What is claimed is:

1. An execution unit for executing a computer program, the execution unit comprising:
a pseudo random number generator implemented in hardware;
wherein the execution unit is configured to execute a masking instruction which, when executed by the execution unit, masks randomly selected first values from a source operand of n values and retains other original values from the source operand to generate a result which includes original values from the source operand and symbols in the respective original locations of the selected first values, wherein the masking instruction includes a probability field defining a probability value for masking values of the source operand; and
wherein the pseudo random number generator is configured to output a first randomised bit string from which random bit sequences are derived for randomly selecting the first values to be masked, wherein the first randomised bit string output from the pseudo random number generator comprises m bits, wherein the execution unit is configured to:
in response to instigation of the masking instruction, obtain the first randomised bit string output by the pseudo random number generator;
divide the first randomised bit string obtained from the pseudo random number generator into p sequences; and
compare each of the p sequences with the probability value to generate a weighted probability indicator for selecting the first values to be masked.

2. The execution unit of claim 1, wherein the masking instruction comprises a source field identifying the source operand, and an indication of a destination register for holding the result.

3. The execution unit of claim 1, comprising an input buffer for holding the source operand and an output buffer for holding the result.

4. The execution unit of claim 1, wherein the n values of the source operand represent weights of links in a neural network.

5. The execution unit of claim 1, wherein the n values of the source operand represent activations defining output values of nodes of a neural network.

6. The execution unit of claim 1, wherein the execution unit is further configured to execute a sequence of instructions comprising instructions for implementing a dot product of the result with a further set of values.

7. The execution unit of claim 1, wherein the execution unit is further configured to execute a sequence of instructions comprising an instruction for writing the result to a memory location after the masking instruction has been executed.

8. The execution unit of claim 1, wherein the source operand comprises four 16-bit values.

9. The execution unit of claim 1, wherein the symbols represent a value of zero.

10. A method of executing, by an execution unit, a computer program comprising a sequence of instructions, the sequence including a masking instruction, the method comprising:
responsive to execution of the masking instruction, randomly selecting first values from a source operand of n values and retaining other original values from the source operand to generate a result which includes original values from the source operand and symbols in the respective original locations of the selected first values, wherein the masking instruction includes a probability field defining a probability value for masking values of the source operand, wherein the randomly selecting the first values includes:
in response to instigation of the masking instruction, obtaining a randomised bit string output comprising m bits from a pseudo random number generator implemented in hardware in the execution unit;
dividing the randomised bit string obtained from the pseudo random number generator into p sequences and comparing each of the p sequences with the probability value to generate a weighted probability indicator for selecting the first values to be masked.

11. The method of claim 10, wherein the masking instruction comprises a source field identifying the source operand, and an indication of a destination register for holding the result.

12. The method of claim 10, wherein the sequence of instructions comprises instructions for implementing a dot product of the result with a further set of values.

13. The method of claim 10, wherein the sequence of instructions comprises an instruction for writing the result to a memory location after the masking instruction has been executed.

14. A computer program comprising a sequence of computer readable instructions stored on non-transitory media, the sequence including a masking instruction which, when executed by an execution unit, causes the execution unit to perform a method comprising:
  randomly selecting first values to mask from a source operand of n values and retaining other original values from the source operand to generate a result which includes original values from the source operand and symbols in the respective original locations of the selected first values, wherein the masking instruction includes a probability field defining a probability value for masking values of the source operand;
  wherein the randomly selecting the first values includes:
  in response to instigation of the masking instruction, obtaining a randomised bit string output comprising m bits from a pseudo random number generator implemented in hardware in the execution unit;
  dividing the randomised bit string obtained from the pseudo random number generator into p sequences; and
  comparing each of the p sequences with the probability value to generate a weighted probability indicator for selecting the first values to be masked.

15. A method of executing, in an execution unit, a computer program comprising a sequence of instructions, the sequence including a masking instruction, the method comprising:
  responsive to execution of the masking instruction, randomly selecting a first value from a source operand of n values and retaining an original value from the source operand to generate a result which includes the original value from the source operand and a symbol in the original location of the first value, wherein the masking instruction includes a probability field defining a probability value for masking values of the source operand; and
  wherein randomly selecting the first value includes:
  in response to instigation of the masking instruction, obtaining a randomised bit string output comprising m bits from a pseudo random number generator implemented in hardware in the execution unit;
  dividing the randomised bit string obtained from the pseudo random number generator into p sequences; and
  comparing each of the p sequences with the probability value to generate a weighted probability indicator for selecting the first value.

16. The method of claim 15, wherein the source operand comprises four 16-bit values.

17. The method of claim 15, wherein the source operand comprises two 32-bit values.

18. The method of claim 15, wherein the symbol represents a value of zero.

19. The method according to claim 15, wherein the probability value has a same number of bits as each sequence of the p sequences.

* * * * *